INVENTOR.
HANS G. BLANK
BY R. J. Frank
ATTORNEY.

July 12, 1966    H. G. BLANK    3,260,889
SIGNAL TRANSLATOR

Filed Dec. 5, 1962    3 Sheets-Sheet 2

NUMBER OF OPEN SWITCHES

INVENTOR.
HANS G. BLANK
BY
R. J. Frank
ATTORNEY.

INVENTOR.
HANS G. BLANK

United States Patent Office 3,260,889
Patented July 12, 1966

3,260,889
SIGNAL TRANSLATOR
Hans G. Blank, Bronx, N.Y., assignor to General Telephone and Electronics Laboratories, Inc., a corporation of Delaware
Filed Dec. 5, 1962, Ser. No. 242,428
14 Claims. (Cl. 315—169)

This invention relates to signal translating devices and in particular to translators utilizing electrically non-linear components.

A signal translator may be defined as an electrical device which converts a discrete input signal into a coded output signal. In general, such devices are provided with a set of input terminals and a set of output terminals. In the absence of an input signal, the translator produces no output signal. However, when an input signal is applied to the input terminals, an output signal appears at one or more of the output terminals. The number and relative positions of the energized output terminals uniquely identify the applied input signal. Stated another way, there is a one-to-one correspondence between the particular input terminals to which the incoming signal is applied and the particular combination of output terminals at which the output signal appears.

Two common types of logic circuits employed in translators are AND and OR circuits. In an AND circuit, an output terminal is energized only when all of a predetermined group of input terminals are energized. In an OR circuit, the output terminal is energized when any one of a predetermined group of input terminals is energized.

A translator utilizing a non-linear resistance layer is disclosed in U.S. Patent 3,004,190 issued October 10, 1961, to E. R. Bowerman et al. In the patented translator, a first set of parallel electrodes having varying lengths is secured to one surface of an electrically non-linear layer and a second set of parallel electrodes of varying length and extending in a direction transverse to the first set is secured to the opposite surface of the layer. When any one of the electrodes in the first set is energized by an input signal, predetermined electrodes in the second set are energized through the non-linear layer. Thus, the translator functions as an OR circuit. This translator is extremely useful in many applications but is not suitable for use in switching circuits or computers which require more complex logic such as combined AND or OR functions.

Accordingly, it is an object of my invention to provide an improved signal translator utilizing an electrically non-linear material.

Another object is to provide a signal translator utilizing an electrically non-linear layer which performs both AND and OR functions.

Still another object is to provide a signal translator which performs both AND and OR functions and can be fabricated simply and inexpensively as an integral unit.

Yet another object is to provide a signal translator which, upon application of a given input signal, energizes a predetermined group of output terminals.

A further object is to provide a signal translator which may be combined with a display device to produce a bar of light having a length determined by the input signal.

In accordance with my invention, I employ a layer of electrically non-linear material of the type wherein the impedance decreases as the voltage applied across the layer increases. Stated another way, the current through any selected portion of the layer in either direction varies according to the equation $I=kV^n$, where I is the current through the non-linear layer, V is the voltage across the selected portion of the layer, $k$ is a constant and $n$ is a number greater than 1. A first group of separated input electrodes including first and second electrode sets extending generally in a first direction is secured to the surfaces of the non-linear layer, the first set being secured to the first surface of the layer and the second set to the second surface of the layer. A second group of separated electrodes including third and fourth electrode sets extending generally in a second direction is also secured to the surfaces of the non-linear layer, the third set being secured to the first surface of the layer and the fourth set to the second surface of the layer. Thus, the electrodes of the first and second groups, since they extend in different directions and are on opposite sides of the non-linear layer, cross over each other at locations which shall be designated cross-over points. At exposed cross-over points, the opposing electrodes on either side of the layer are conductively attached to the non-linear layer and are said to be electrically coupled; at unexposed cross-over points, the opposing electrodes are insulated from the layer.

In one embodiment of my invention, a translator is provided in which the first set of electrodes are OR inputs and the second set of electrodes are AND inputs. Selected electrodes of the second set are coupled through the non-linear layer to selected electrodes of the third set at exposed cross-over points and selected electrodes of the first set are coupled through the layer to selected electrodes of the fourth set at other exposed cross-over points. In addition, selected electrodes of the third and fourth sets are coupled through the non-linear layer at predetermined overlapping locations.

When a signal is applied to any one of the electrodes in the first set which is coupled to an electrode of the fourth set, the voltage on the fourth set electrode is raised to a value required to operate an output device. When a signal is applied to all of the electrodes in the second set that are coupled to an electrode of the third set, the voltage on the third set electrode is similarly raised to an operating value. If less than all the electrodes in the second set which are coupled to the third set electrode are energized, then the voltage on the third set electrode remains below the operating value. In addition, a fourth set electrode which is coupled to a third set electrode is energized when a signal is applied to all of the second set electrodes coupled to the third set electrode. The output terminals are connected to the fourth set electrodes.

The above objects of and the brief introduction to the present invention will be more fully understood and further objects and advantages will become apparent from a study of the following description in connection with the drawings, wherein.

Figure 1:
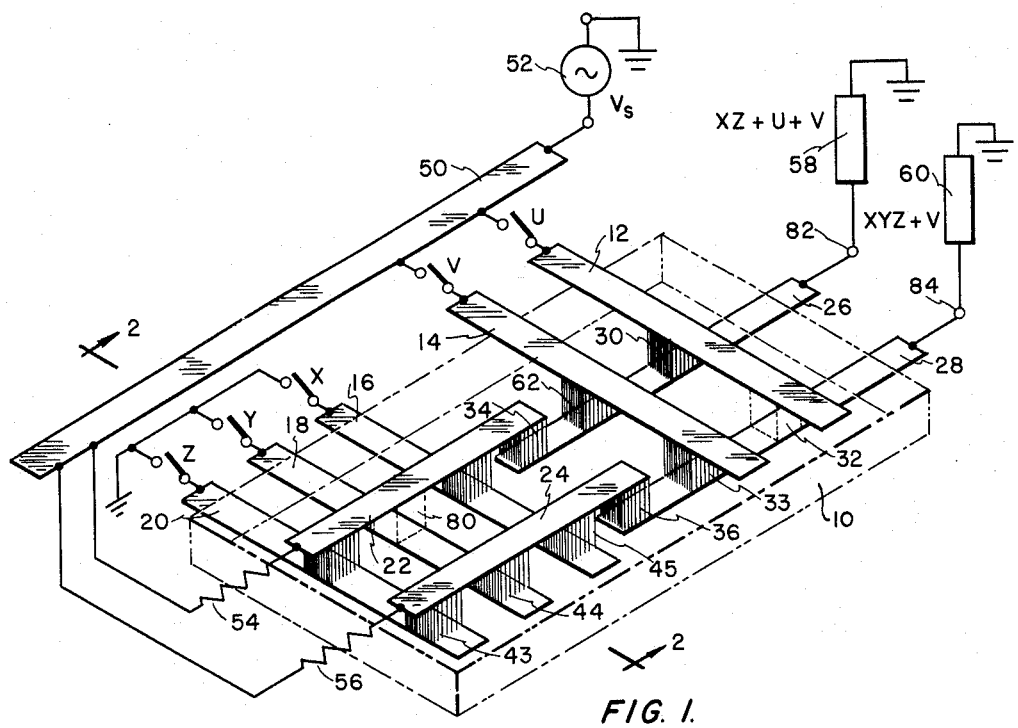
FIG. 1 is a partial schematic diagram of a translator embodying the principle of my invention.

Referring to FIG. 1, there is shown a layer of electrically non-linear material 10. When a voltage is applied across a portion of this layer, the electrical impedance of this portion of the layer decreases as the voltage increases. The layer can, for example, be composed of a settled layer of cadmium sulfide powder and epoxy resin, as described in greater detail in U.S. Patent 3,220,881, issued November 30, 1965, to S. Yando.

A first set of parallel spaced electrodes 12 and 14 are secured to the top surface of layer 10 and a second set of parallel spaced electrodes 16, 18, and 20 are secured to the bottom surface of layer 10. A third set of parallel separated electrodes 22 and 24 are secured to the top of layer 10 extending in a direction transverse to electrodes 16, 18, and 20 and a fourth set of parallel separated electrodes 26 and 28 are secured to the bottom of layer 10 extending in the same direction as electrodes 22 and 24. The left ends of electrodes 26 and 28 are in registration with the right ends of electrodes 22 and 24, electrodes 26 and 28 extending under electrodes 12 and 14 as indicated by the dashed lines. Although, for simplicity only, two electrodes have been shown in the first, third and fourth sets and three in the second set, it shall be understood that each set can have any desired number of electrodes.

Top electrode 12 and bottom electrode 26 are conductively attached to layer 10 at their cross-over point as indicated by the darkened area 30. As a result, a non-linear resistance element is formed between electrodes 12 and 26 at cross-over point 30. In contrast, electrode 28 is insulated from layer 10 at cross-over point 32 and a non-linear resistance element is not formed between these electrodes. Similarly, non-linear resistance elements are formed between electrode 14 and electrodes 26 and 28, electrode 16 and electrodes 22 and 24, electrode 18 and electrode 24, and electrode 20 and electrodes 22 and 24. In addition, electrodes 22 and 24 overlap electrodes 26 and 28 respectively at 34 and 36 forming non-linear resistance elements at these locations. The particular cross-over points at which non-linear resistance elements are formed depend upon the desired translation code.

Figure 2:
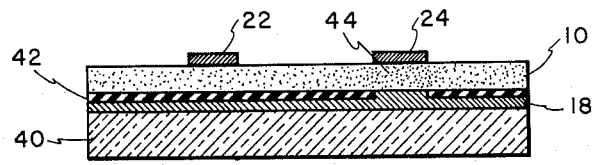
FIG. 2 is a cross-sectional diagram showing details of the construction of the translator of FIG. 1.

FIG. 2 shows a cross-section taken along electrode 18 of FIG. 1 depicting actual details of construction of the translator not included in the schematic diagram of FIG. 1. As indicated, electrode 18 (which may be formed of a layer of tin oxide) is deposited on a glass substrate 40 and is insulated from non-linear resistance layer 10 along most of its length by a layer of glass enamel 42. However, at cross-over point 44 (point 44 being designated as the volume subtended by electrodes 18 and 24), the glass enamel has been removed to permit electrode 18 to make direct contact with layer 10 and form a non-linear resistance element with electrode 24. Electrodes 22 and 18 do not form a non-linear resistance element because electrode 18 is insulated from non-linear layer 10 by glass enamel layer 42 at the point where they cross.

Returning to FIG. 1, it is seen that a supply bus 50, energized by an alternating voltage source 52 connected between the bus and ground, is coupled by means of linear resistors 54 and 56 to electrodes 22 and 24 respectively. (A linear resistor is one which, in contradistinction to a non-linear resistor, has a resistance which does not change as a function of voltage.) In addition, bus 50 is coupled to electrodes 12 and 14 through switches U and V respectively. Electrodes 16, 18, and 20 are coupled to ground through switches X, Y and Z and electrodes 30 and 32 are coupled to ground through load impedances 58 and 60 respectively.

Electrodes 12 and 14 comprise the OR input to the translator. Thus, if the voltage on either electrode 12 or electrode 14 is increased by closing switch U or switch V, the resistance of the non-linear layer 10 at the cross-over points 30 and 62 decreases sharply and the voltage impressed across load impedance 58 increases to the value required to operate the load. Similarly, load impedance 60 is energized when switch V is closed but is not energized if only switch U is closed since the electrodes at cross-over point 32 do not form a resistance element. Electrodes 16, 18 and 20 comprise the AND input to the translator. If all of the switches X, Y and Z are open, load impedances 58 and 60 are energized.

Figure 3:
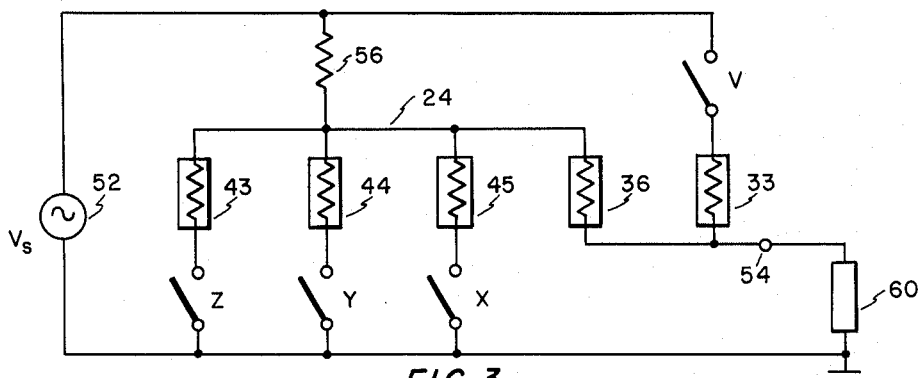
FIG. 3 is a schematic diagram of a portion of the translator of FIG. 1.
Figure 4:
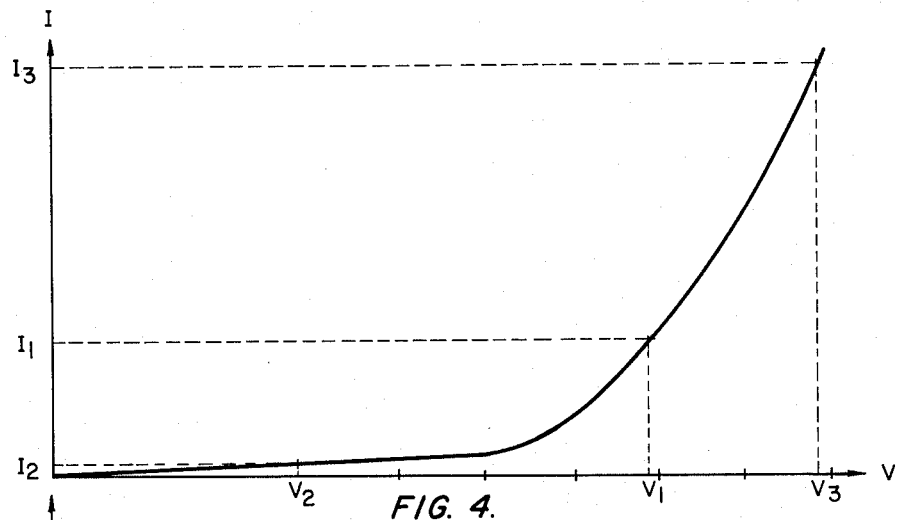
FIG. 4 is a curve showing the voltage-current characteristic of the non-linear layer.

Operation of the translator may be best explained by reference to FIG. 3 which shows an equivalent circuit of a portion of the translator of FIG. 1, and to FIG. 4 which is a plot of the current as a function of voltage across any of the non-linear resistance elements. In FIG. 3 the non-linear resistance elements of FIG. 1 are depicted schematically by resistor symbols enclosed by rectangles and are designated by the same number as the corresponding cross-over points of FIG. 1.

Assume that switch X is closed and that switches Y, Z and V are open. Due to the design of the non-linear resistance elements, the current through load 60 and non-linear resistance element 36 is equal to $I_2$ (FIG. 4), a value too low to operate the load. (Load 60 may, for example, be an electroluminescent lamp which will emit light when the current through it is $I_1$ but is dark when the current equals $I_2$.) The current through non-linear resistance element 45 is equal to $I_3$ and the voltage between electrode 24 and ground is $V_3$. Closing switches Y and Z does not substantially affect the voltage on electrode 24 or the current through load 60 as shown by the graph of FIG. 5 which is a plot of the voltage on electrode 24 versus the number of switches X, Y and Z which are open.

Figure 5:
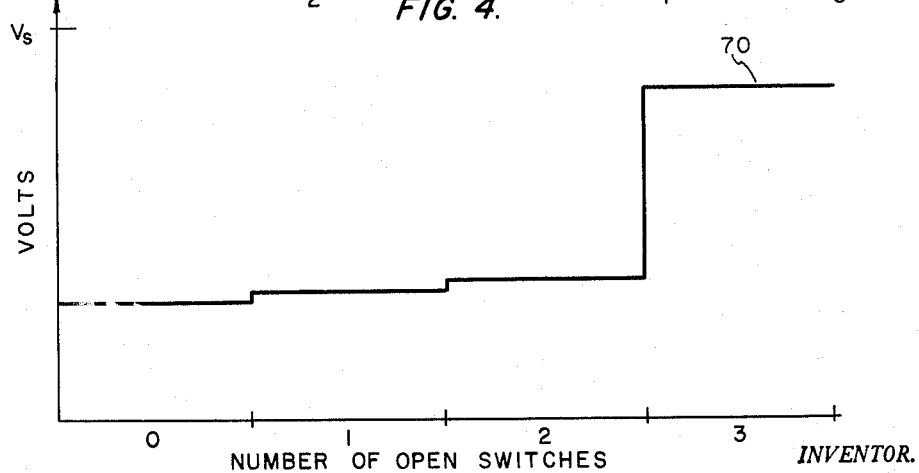
FIG. 5 is a graph useful in explaining the operation of the AND circuit of FIG. 3.

If all of the switches X, Y, and Z are open, then the voltage on electrode 24 rises as shown at 70 in FIG. 5, the current through the load increases to $I_1$, and the load is energized. Closing switch V while any or all of switches X, Y, and Z are closed, similarly permits a current equal to $I_1$ to flow through load 60. The supply voltage and the characteristics of the non-linear resistance elements are chosen so that the voltage across the non-linear resistance element 36 is small enough to cause the element to be in a high impedance state thereby isolating the load from the AND circuit.

With the translator shown in FIG. 1, load impedance 58 is energized when switches X and Z are open irrespective of the states of switches U and V. Load 58 is also energized when either V or U or both U and V are closed. Thus the translation code for output terminal 82 to be energized can be expressed as $XZ+U+V$ regardless of the positions of switches X, Y, and Z. Similarly, the output at terminal 84 is $XYZ+V$ indicating that an output is obtained when switches X and Y and Z are all open or when switch V is closed.

Figure 6:
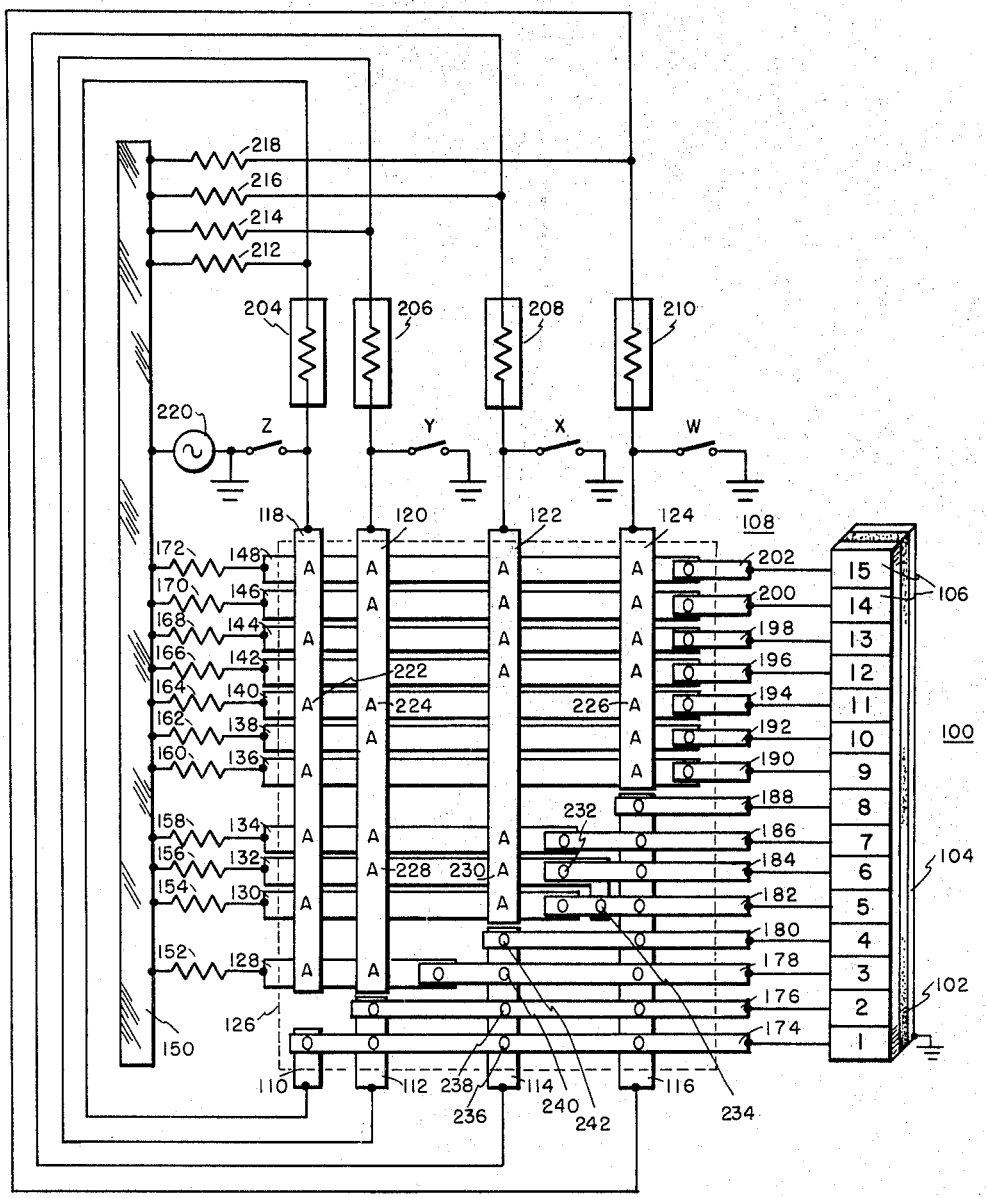
FIG. 6 is an embodiment of my invention used in conjunction with an electroluminescent bar type display.

In FIG. 6 there is shown a translator utilizing the principles of my invention to drive an electroluminescent bar display device 100. Display device 100 consists of an electroluminescent layer 102 having a grounded rear electrode 104 and a plurality of segmented, transparent front electrodes 106. Segmented electrodes 106 are numbered from 1 to 15 corresponding to the output terminals of translator 108 to which they are connected. The number of segments energized depends upon the magnitude of the input quantity as represented by a binary number containing four bits. The positions of switches W, X, Y and Z correspond to each bit, an open switch representing a binary 1 and a closed switch a binary "0." For example, if the position of these switches corresponds to the decimal number 15, then all 15 segments are energized. If the switch position corresponds to the decimal number 7, then segments 1 to 7 are energized. When each segment is energized, the electroluminescent layer subtended between it and the back electrode 104 emits light. Thus, the display produces a bar of light having a length proportional to the magnitude of the input signal.

The translator 108 comprises a first set of electrodes 110, 112, 114 and 116 constituting the OR inputs and a second set of electrodes 118, 120, 122 and 124 comprising the AND inputs. The first set electrodes are secured to the bottom of non-linear resistance layer 126 (shown by dashed lines) and the second set electrodes are secured to the top of the layer. A third set of electrodes 128–148 are secured to the bottom of layer 126 and are coupled to a supply bus 150 by resistors 152–172 respectively. A fourth set of electrodes 174–202 are secured to the top of layer 126 and are connected to segments 1–15 of the display device. In the schematic representation of FIG. 6, the cross-over points at which the electrodes are conductively connected to the non-linear layer are designated by either the letter O to indicate that the non-linear element between the electrodes provides an OR function or by an A to indicate an AND function. At those crossover points which are designated by neither an A or an O, at least one of the electrodes is insulated from the non-linear layer 126.

Electrodes 110–116 are coupled to electrodes 118–124 through non-linear resistors 204, 206, 208 and 210 respectively and are connected to supply bus 150 through linear resistors 212, 214, 216 and 218 respectively. Electrodes 118–124 are grounded through switches Z, Y, X and W respectively which control the input to electrodes 110–124. A source of alternating voltage 220 is coupled between bus 150 and ground.

The operation of the circuit may be best understood by assuming a particular input to the translator. If, for example, it is desired to display the decimal number 11, switches W, Y, and Z are opened and switch X is left closed. This corresponds to the binary number 1011. With switch W open, electrode 124 is removed from ground potential and similarly, with switches Y and Z open, electrodes 120 and 118 are ungrounded. Therefore, segment 11 of display device 100 is energized through linear resistor 164 since the AND resistance elements at cross-over points 222, 224 and 226 are ungrounded in the manner explained in connection with FIG. 1. In addition, segment 10 is energized since switches W and Y are open and segment 9 is energized since switches W and Z are open. With switch W open, electrode 116 rises toward bus potential and therefore segments 1–8 are energized through the OR non-linear resistance elements. Segments 12, 13, 14 and 15 are not energized since this only occurs when switch X is open ungrounding the AND circuits connected to electrode 122. Although electrodes 130, 132 and 134 are similarly coupled to ground through AND circuits of electrode 122, segments 5, 6 and 7 are energized through the OR circuits coupled to electrode 116.

The following table designates the positions of the switches to energize all of the segments up to the designated one. The letter C indicates that the switch is closed and the letter O indicates that the switch is open.

| To energize all segments up to— | Switch Positions | | | |
|---|---|---|---|---|
| | W | X | Y | Z |
| 1 | C | C | C | O |
| 2 | C | C | O | C |
| 3 | C | C | O | O |
| 4 | C | O | C | C |
| 5 | C | O | C | O |
| 6 | C | O | O | C |
| 7 | C | O | O | O |
| 8 | O | C | C | C |
| 9 | O | C | C | O |
| 10 | O | C | O | C |
| 11 | O | C | O | O |
| 12 | O | O | C | C |
| 13 | O | O | C | O |
| 14 | O | O | O | C |
| 15 | O | O | O | O |

Taking another example, the chart shows that to energize segments 1 to 6, switches W and Z must be closed and switches X and Y must be open. Since switches X and Y are open, electrodes 120 and 122 and AND junctions 228 and 230 are ungrounded, segment 6 being energized through resistor 156, OR junction 232, and electrode 184. Segment 5 is energized through OR junction 234 and segments 1–4 are energized through OR junctions 236, 238, 240 and 242.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A signal translator comprising
(a) an electrically non-linear layer having first and second surfaces, the electrical impedance of said layer decreasing as the magnitude of a voltage applied thereacross increases,
(b) a first group of spaced input electrodes including first and second electrode sets affixed to the first and second surfaces of said layer respectively, said first and second sets of electrodes extending generally in a first direction, and
(c) a second group of spaced electrodes including third and fourth electrode sets affixed to the first and second surfaces of said layer respectively, said third and fourth sets of electrodes extending generally in a second direction, selected electrodes of both said first and fourth sets being conductively connected to said layer only at the locations where said selected first and fourth sets electrodes cross and selected electrodes of both said second and third sets being conductively connected to said layer only at the locations where said selected second and third set electrodes cross.

2. A signal translator comprising
(a) an electrically non-linear layer having first and second surfaces, the electrical impedance of said layer decreasing as the magnitude of a voltage applied thereacross increases,
(b) a first group of spaced parallel input electrodes including first and second electrode sets affixed to the first and second surfaces of said layer respectively, said first and second sets of electrodes extending in a first direction, and
(c) a second group of spaced parallel electrodes including third and fourth electrode sets affixed to the first and second surfaces of said layer respectively, said third and fourth sets of electrodes extending in a second direction, selected electrodes of both said first and fourth sets being conductively connected to said layer only at the locations where said selected first and fourth set electrodes cross, selected electrodes of both said second and third sets being conductively connected to said layer only at the locations where said selected second and third set electrodes cross, and selected electrodes of both said third and fourth sets being conductively connected to said layer only at predetermined locations where said selected third and fourth sets electrode overlap.

3. A signal translator as defined in claim 2 wherein said first direction is perpendicular to said second direction.

4. A signal translator comprising
(a) an electrically non-linear layer having first and second surfaces, the electrical impedance of said layer decreasing as the magnitude of a voltage applied thereacross increases,
(b) a first group of spaced parallel input electrodes including first and second electrode sets affixed to the first and second surfaces of said layer respectively, said first and second sets of electrodes extending in a first direction,
(c) a second group of spaced parallel electrodes including third and fourth electrode sets affixed to the first and second surfaces of said layer respectively, said third and fourth sets of electrodes extending in a second direction, selected electrodes of both said first and fourth sets being conductively connected to said layer only at the locations where said selected first and fourth set electrodes cross, selected electrodes of both said second and third sets being conductively connected to said layer only at the locations where said selected second and third set electrodes cross, and selected electrodes of both said third and fourth sets being conductively connected to said layer only at predetermined locations where said selected third and fourth set electrodes overlap,
(d) means for selectively coupling the electrodes of said first set to a first terminal of a voltage source having first and second terminals,
(e) means for selectively coupling the electrodes of said second set to the second terminal of said voltage source,
(f) means for coupling the electrodes of said third set to the first terminal of said voltage source, and
(g) means for coupling the electrodes of said fourth set to corresponding output terminals.

5. A signal translator as defined in claim 4 wherein said means for coupling the electrodes of said third set to the first terminal of said voltage source are linear resistors.

6. A signal translator comprising
(a) an electrically non-linear layer having first and second surfaces, the electrical impedance of said layer decreasing as the magnitude of a voltage applied thereacross increases,
(b) a first group of spaced electrodes including first and second electrode sets affixed to the first and second surfaces of said layer respectively, said first and second sets of electrodes extending generally in a first direction,
(c) a second group of spaced electrodes including third and fourth electrode sets affixed to the first and second surfaces of said layer respectively, said third and fourth sets of electrodes extending generally in a second direction, and
(d) an insulating layer interposed between said first and third sets of spaced electrodes and said non-linear layer, said insulating layer being removed at predetermined locations to permit portions of predetermined electrodes of said first and third sets of electrodes to electrically contact said non-linear layer.

7. A signal translator comprising
(a) an insulating base,
(b) a first plurality of spaced electrodes affixed to said base, a first portion of said first plurality of electrodes extending in a first direction and a second portion of said first plurality of electrodes extending in a second direction,
(c) an electrically non-linear layer having first and second surfaces, the electrical impedance of said layer decreasing as the magnitude of a voltage applied thereacross increases,
(d) an insulating layer interposed between said first plurality of spaced electrodes and the second surface of said non-linear layer, said insulating layer being removed at predetermined locations to permit portions of predetermined electrodes of said first plurality of electrodes to electrically contact said non-linear layer, and
(e) a second plurality of electrodes secured to the first surface of said non-linear layer, a third portion of said second plurality of electrodes extending in said first direction and a fourth portion of said second plurality of electrodes extending in said second direction.

8. A signal translator comprising
(a) a first group of electrically non-linear resistance elements each having first and second electrodes,
(b) linear resistance means for coupling the first electrodes of said non-linear resistance elements to a first terminal of a voltage source,
(c) first switching means for selectively coupling the second electrodes of said first group of non-linear resistance elements to a second terminal of said voltage source,
(d) a second group of electrically non-linear resistance elements each having first and second electrodes,
(e) second switching means for selectively coupling the first electrodes of said second group of non-linear resistance elements to the first terminal of said voltage source,
(f) a third non-linear resistance element connected between the first electrodes of said first group of non-linear resistance elements and the second electrodes of said second group of non-linear resistance elements, and
(g) output terminal means connected to the second electrodes of said second group of non-linear resistance elements and the second terminal of said voltage source.

9. A signal translator for receiving binary input signals having values from 0 to N comprising
(a) an electrically non-linear layer having first and second surfaces, the electrical impedance of said layer decreasing as the magnitude of a voltage applied thereacross increases,
(b) first and second sets of spaced, parallel input electrodes of varying lengths affixed to the first and second surfaces of said layer respectively and extending in a vertical direction, corresponding electrodes of said first and second sets being in vertical alignment with their adjacent ends spaced in said vertical direction,
(c) a third set of spaced, parallel electrodes of varying lengths affixed to the first surfaces of said layer and extending in a horizontal direction transverse to said second set of electrodes, selected electrodes of both said first and third sets being conductively connected to said layer only at the locations where said selected first and third set electrodes cross,
(d) a fourth set of spaced parallel output electrodes of varying length affixed to the second surface of said layer and extending in said horizontal direction, corresponding electrodes of said third and fourth sets being in horizontal alignment with adjacent ends overlapping and conductingly connected to said layer and said overlapping ends, and
(e) means for applying binary input signals to said first and second sets of input electrodes.

10. A signal translator as defined by claim 9 wherein the number of electrodes in said first and second sets is not less than the number of bits in N, the number of electrodes in said third set is not less than N minus the number of bits in N, and the number of electrodes in said fourth set is not les than N.

11. A signal translator for receiving binary input signals having values from 0 to N comprising
(a) an electrically non-linear layer having first and second surfaces, the electrical impedance of said layer decreasing as the magnitude of a voltage applied thereacross increases,
(b) first and second sets of spaced, paralled input electrodes of varying lengths affixed to the first and second surfaces of said layer respectively and extending in a vertical direction, corresponding electrodes of said first and second sets being in vertical alignment with their adjacent ends spaced in said vertical direction,
(c) a third set of spaced, parallel electrodes of varying lengths affixed to the first surfaces of said layer and extending in a horizontal direction transverse to said second set of electrodes, selected electrodes of both said first and third sets being conductively connected to said layer only at the locations where said selected and third set electrodes cross,
(d) a fourth set of spaced parallel output electrodes of varying length affixed to the second surface of said layer and extending in said horizontal direction, corresponding electrodes of said third and fourth sets being in horizontal alignment with adjacent ends overlapping and conductingly connected to said layer and said overlapping ends,
(e) a plurality of non-linear resistors, each of said non-linear resistors being coupled between corresponding electrodes of said first and second sets,
(f) a voltage source having first and second terminals,
(g) a plurality of linear resistors, each of said linear resistors being coupled between one terminal of said voltage source and a corresponding electrode of said first set and
(h) switching means, said switching means comprising a plurality of switches for selectively connecting each of the electrodes of said second set to the second terminal of said voltage source.

12. A signal translator for receiving binary input signals having values from 0 to N comprising
(a) an electrically non-linear layer having first and second surfaces, the electrical impedance of said layer decreasing as the magnitude of a voltage applied thereacross increases,
(b) first and second sets of spaced, parallel input electrodes of varying lengths affixed to the first and second surfaces of said layer respectively and extending in a vertical direction, corresponding electrodes of said first and second sets being in vertical alignment with their adjacent ends spaced in said vertical direction,
(c) a third set of spaced, parallel electrodes of varying lengths affixed to the first surfaces of said layer and extending in a horizontal direction transverse to said second set of electrodes, selected electrodes of both said first and third sets being conductively connected to said layer only at the locations where said selected first and third set electrodes cross,
(d) a fourth set of spaced parallel output electrodes of varying length affixed to the second surface of said layer and extending in said horizontal direction, corresponding electrodes of said third and fourth sets being in horizontal alignment with adjacent ends overlapping and conductingly connected to said layer and said overlapping ends,
(e) a plurality of non-linear resistors, each of said non-linear resistors being coupled between corresponding electrodes of said first and second sets,
(f) a voltage source having first and second terminals,
(g) a plurality of linear resistors, each of said linear resistors being coupled between one terminal of said voltage source and a corresponding electrode of said first set and
(h) an output device comprising an electroluminescent layer, a common electrode secured to one surface of said electroluminescent layer, and a plurality of separated electrode segments secured to the other surface of said electroluminescent layer, each of said electrode segments being coupled to a corresponding electrode of said fourth set.

13. A signal translator comprising
(a) an electrically non-linear layer having first and second surfaces, the electrical impedance of said layer decreasing as the magnitude of a voltage applied thereacross increases,
(b) a first group of spaced parallel input electrodes including first and second electrode sets affixed to the first and second surfaces of said layer respectively, said first and second sets of electrodes extending in a first direction, and
(c) a second group of spaced parallel electrodes including third and fourth electrode sets affixed to the first and second surfaces of said layer respectively, said third and fourth sets of electrodes extending in a second direction, the electrodes of said third set being transverse to the electrodes of said second set and the electrodes of said fourth set being transverse to the electrodes of said first set.

14. A signal translator as defined by claim 13 wherein electrodes of said third set are in registration with corresponding electrodes of said fourth set.

References Cited by the Examiner
UNITED STATES PATENTS

| | | | |
|---|---|---|---|
| 3,004,190 | 10/1961 | Bowerman et al. | 315—316 X |
| 3,089,132 | 5/1963 | Vogt | 340—347 |
| 3,118,133 | 1/1964 | Meeker et al. | 340—173.2 X |

JOHN W. HUCKERT, *Primary Examiner.*

D. O. KRAFT, *Assistant Examiner.*